Dec. 29, 1959  J. B. GILL  2,919,146
PIPE COUPLING
Filed April 18, 1957  3 Sheets-Sheet 1
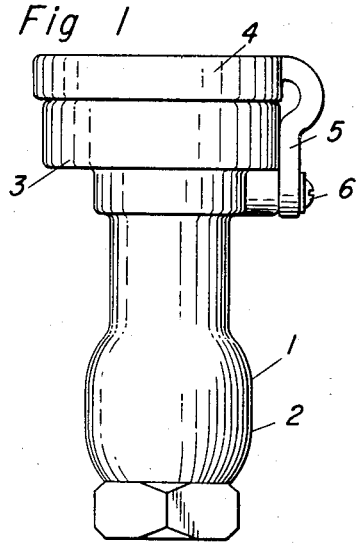
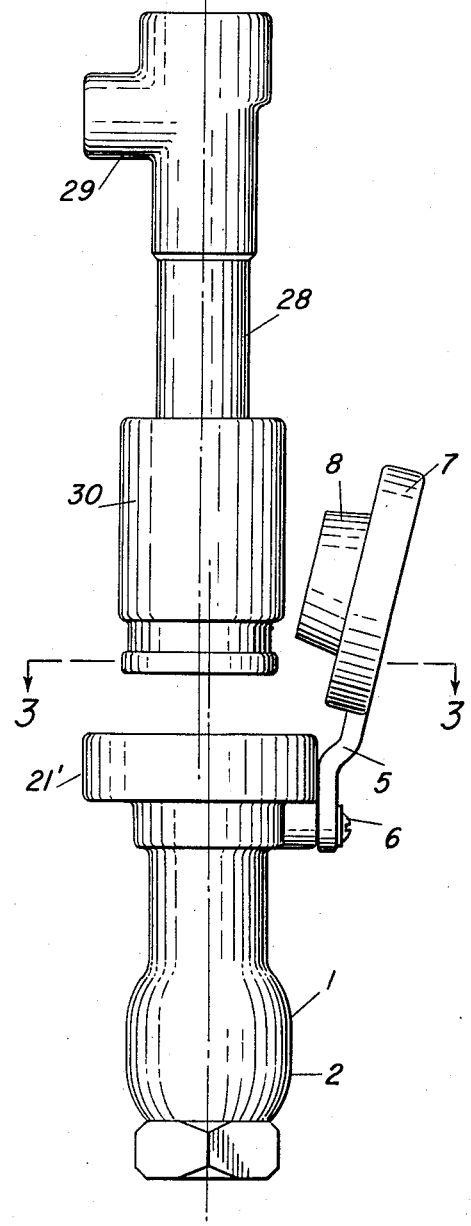
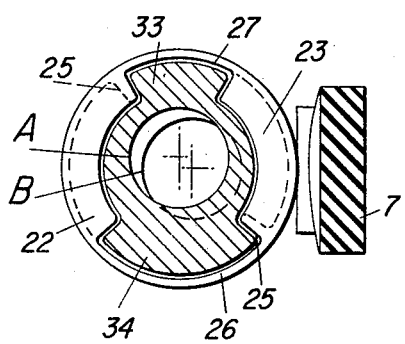
INVENTOR.
John B. Gill
BY  A. Schapp,
Att'y

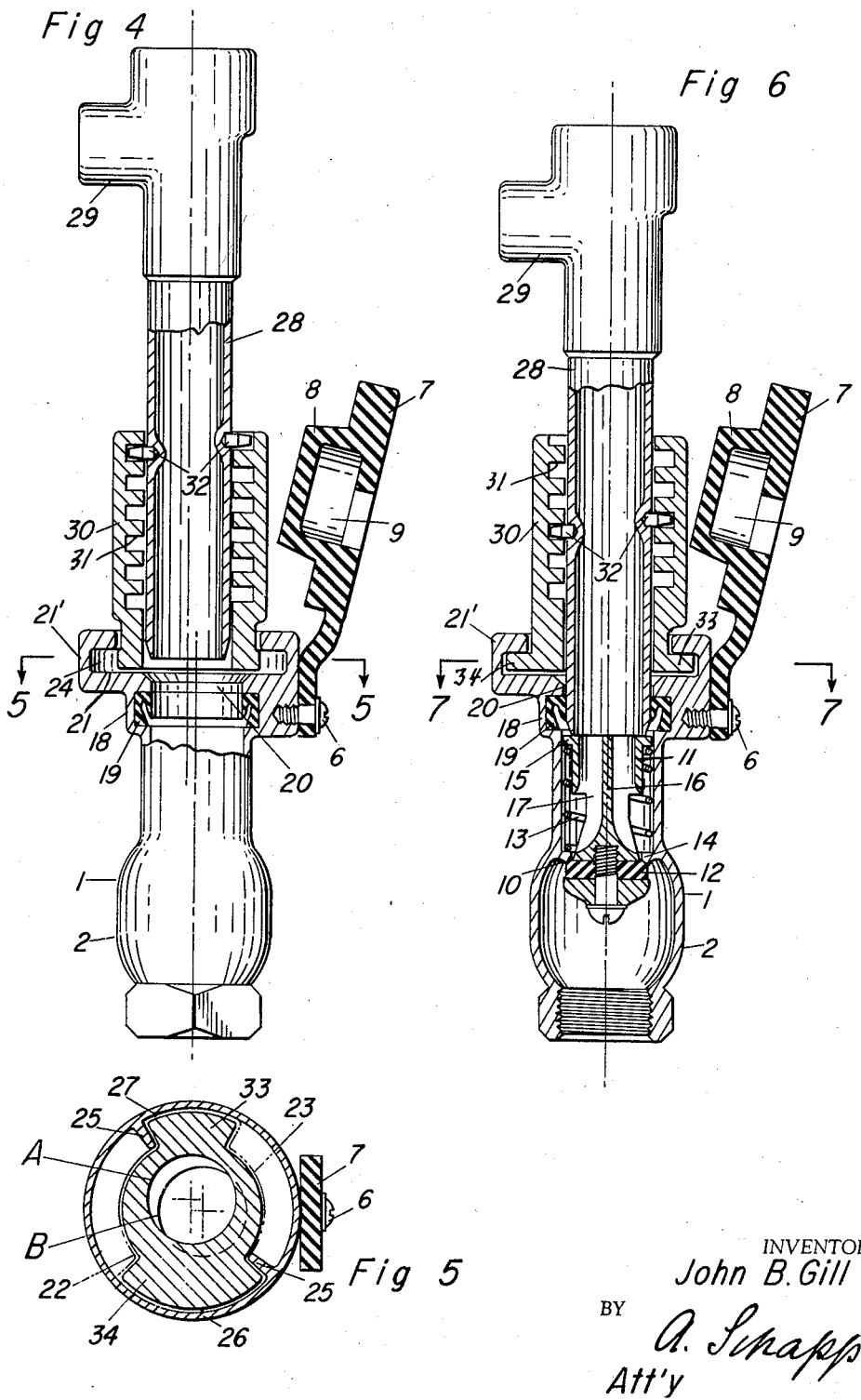

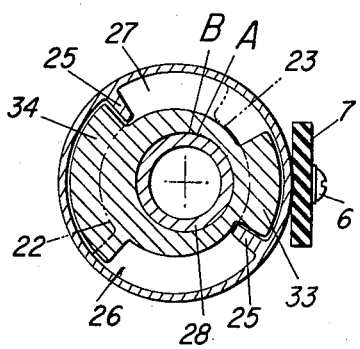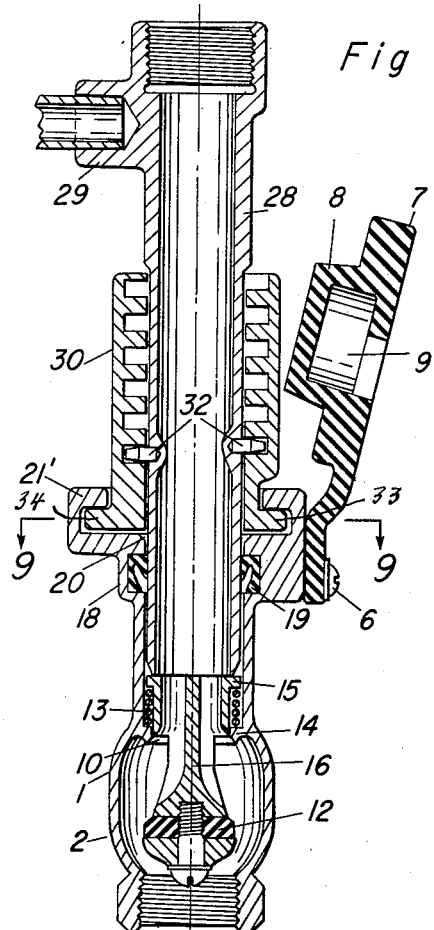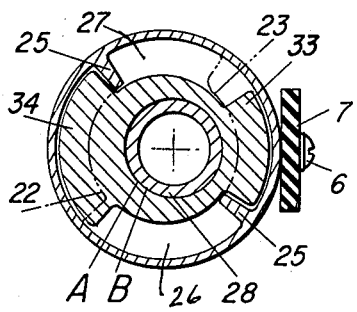

United States Patent Office 2,919,146
Patented Dec. 29, 1959

2,919,146
PIPE COUPLING
John B. Gill, Torrance, Calif.
Application April 18, 1957, Serial No. 653,686
7 Claims. (Cl. 285—33)

The present invention relates to improvements in a pipe coupling intended particularly for use in connection with a sprinkler system and directed more specifically to a novel method of connecting the hose of a sprinkler system to a valve body mounted upon a riser forming the terminal of an underground water supply.

More particularly, the present invention contemplates an improvement over the quick-coupling valve and hose connection described in my co-pending application, Serial Number 427,104, filed May 3, 1954, now Patent No. 2,829,907, issued April 8, 1958.

In the device of the patent application the valve body has a valve spaced from the upper end and has a semicircular grooved collar at the upper end thereof, and the pipe section at the end of the hose has a sleeve with an annular flange adapted for sidewise introduction into the grooved collar, so as to bring the pipe section into registry with the valve body. The sleeve and the pipe section are provided with cooperating means for advancing the alined pipe section into the valve body, and the sleeve is operative, upon further advance, to open the valve.

While this structure operates very satisfactorily, I have found it advantageous to give the operator a more positive control over the operation of the sleeve which will maintain the valve body and the pipe section in assembled relation even after the complete retraction of the pipe section from the valve body, and which will call for positive action on the part of the operator for the final disengagement of the pipe section.

The object of this arrangement is to make it impossible for the water pressure, in case of a delayed closing of the valve, to throw off the coupling sleeve and the pipe section and to gush into the face of the operator.

Further objects and advantages of my invention will appear as the specification proceeds, and the new and useful features of my pipe coupling will be fully defined in the claims hereto attached.

The preferred form of my invention is illustrated in the accompanying drawing, forming part of this application, in which:

Figure 1 shows a side view of a valve body used in my invention, with a coupling collar at its upper end and a cap for the same in closed position;

Figure 2, a side view of the same valve body with the cap in open position, with a pipe section and a coupling sleeve ready for connection to the collar;

Figure 3, a cross-section taken along line 3—3 of Figure 2;

Figure 4, a side view of the coupling as it appears upon initial insertion of the coupling sleeve into the coupling collar;

Figure 5, a section taken along line 5—5 of Figure 4;

Figure 6, a view similar to that of Figure 4, with the coupling sleeve and coupling collar fully engaged and the pipe section partly inserted into the valve body;

Figure 7, a section taken along line 7—7 of Figure 6;

Figure 8, a view similar to that of Figure 6, with the pipe section fully inserted into the valve body and the valve open; and Figure 9, a section taken along line 9—9 of Figure 8.

While I have shown only the preferred form of my invention, it should be understood that various changes or modifications may be made within the scope of the claims hereto attached, without departing from the spirit of the invention.

Referring to the drawings in detail, the valve body 1 comprises a tubular housing 2, having a lower end threaded for connection to a riser used in an underground water system and having an eccentric collar 3 at its upper end.

The collar 3 is normally closed by means of a rubber cap 4 having a depending hinge section 5 secured upon the outside of the collar by means of a screw 6.

The cap 4 is molded to normally extend at a right angle from the hinge section so as to automatically assume a closing position with respect to the collar when allowed to do so.

The cap comprises a rim section 7 overlying the collar and a body section 8 extending into the collar, and is formed with a pocket 9 serving as a thumb-hold when it is desired to move the cap into an inactive position, as shown in Figure 4.

The valve body is formed with a downwardly facing valve seat 10, substantially midway the length thereof, and a valve cage 11 is slidable in the body, the cage being generally cylindrical in form and having a bottom washer 12 adapted to bear against the valve seat from below, with a spring 13 tending to force the washer upon the seat.

The spring 13 bears, at its lower end, on a flange 14 forming the valve seat, and, at its upper end, against an annular flange 15 projecting from the upper end of the valve cage.

The valve cage is formed with a central partition 16, and valve openings 17 on opposite sides of the partition, the openings being shaped to increase in port area from the lower end to the upper end, so as to allow the stream passing through the valve to be adjusted from a mere dribble to a full flow, depending upon the position of the cage.

The partition tends to straighten out the streams before they join to avoid turbulence and effect a smooth flow.

Immediately above the valve cage, there is provided an annular pocket 18 to receive a gasket 19 which has an annular depending lip to serve as a seal against the descending pipe section to be described.

The valve body terminates, at its upper end, in the eccentric collar 3 forming one part of the coupling. This collar has an opening 20 concentric with the valve body and made to have a sliding fit with the pipe section, a flat bottom 21, an annular rim 21', and two inwardly turned, segmental flanges 22—23, forming inwardly facing, segmental grooves 24 with the bottom of the collar. At the end of each groove there is a stop 25.

The segmental spaces 26—27 between the flanges are left open and they are of unequal width as appears from the drawing.

The pipe section 28 which has a handle connection, as at 29, is made to have a sliding fit in the collar opening and carries the coupling sleeve 30 intended for cooperation with the collar in coupling the pipe section to the valve body.

The sleeve is formed with an internal thread 31 and the pipe section has a pair of projecting pins 32 adapted to ride in the thread for advancing or retracting the pipe section with respect to the sleeve.

The sleeve has, at its lower end, a pair of outwardly projecting segmental flanges 33—34, the flanges being adapted to enter the segmental spaces 26—27 of the collar (see Figure 3) and to be turned into the grooves underneath the flanges 22—23 until striking the stops 25.

The sleeve flanges are eccentric with respect to the pipe section in the same manner that the collar is eccentric with respect to the valve body. On the other hand, the sleeve flanges are concentric with the collar, and the pipe section is mounted with respect to the sleeve flanges in such a manner that, upon initial insertion (see Figure 3), the sleeve opening, identified by the circle A, is disalined with respect to the collar opening, identified by the circle B.

It is apparent that, in this position, the pipe section cannot pass into the collar or into the valve housing.

When the coupling sleeve is turned through an angle of 90 degrees in clockwise direction (see Figure 7), the sleeve opening A moves into registry with the collar opening B, and the openings A and B are now alined, so as to allow the pipe section to enter the valve body.

In its general features, the coupling between the collar and the sleeve resembles a bayonet joint, and will be thus referred to in the claims hereto attached.

In operation, the valve body, attached to a riser in an underground water system, is normally covered by the rubber cap 4, as in Figure 1.

When the operator wishes to connect the pipe section to the valve body, he swings the cap sidewise, as in Figure 2, and with the pipe unit 28 fully retracted brings the coupling sleeve 30 opposite the coupling collar on the valve body in such a manner that the flanges 33—34 register with the spaces 26—27. Since the flanges are of unequal length, and the spaces correspondingly, there is only one proper position for the parts, as shown in Figures 2 and 3.

Next, the operator pushes the sleeve into actual engagement with the collar, with the sleeve flanges 33—34 disposed in the spaces 26—27, as illustrated in Figures 4 and 5.

This position leaves the sleeve opening (circle A) out of alinement with the collar opening (circle B), so that there is no possibility of screwing down the pipe section.

As a third step, the operator turns the coupling sleeve through an angle of 90 degrees, with the sleeve flanges 33—34 entering underneath the collar flanges 22—23 and coming to stop against the members 25. During this movement, the sleeve opening (A) moves into registry with the collar opening (B), as shown in Figures 6 and 7.

When the parts have reached this position, the pipe section 28 can be screwed down into the valve body, and Figure 6 shows the pipe section screwed down in part, just enough for the lower end, which is formed with a taper, to pass the gasket 19 and to make contact with the upper flange 15 of the valve cage.

Figures 8 and 9 finally show the pipe section in end position, with the valve cage fully depressed and the water free to pass through the cage openings and past the partition 16 into the pipe section.

To disconnect the pipe section, the operator first turns the pipe section to retract the same to the position of Figure 6 which allows the valve to close completely. He next retracts the pipe section further until it clears the bottom 21 of the collar. Only then is it possible to disengage the coupling, or bayonet joint, by turning the coupling sleeve counter-clockwise through an angle of 90 degrees, which brings the parts back to the position of Figure 5 and allows the sleeve to be drawn out of the collar.

It is obvious, from the description and the drawings, that it is impossible to rotate the coupling sleeve counter-clockwise while the pipe section is depressed into the valve body. This is equally true of the situation depicted in Figure 6, before the valve is opened, as it is in Figure 8 with the valve fully open.

Thus, it will be seen that it is impossible to disengage the coupler from the valve body at any time when the valve is open, or during the time that the pipe section is engaging the gasket 19 to insure water-tightness while the valve is in operation.

On the other hand, it is impossible to screw the pipe section down into the valve body until the flange of the coupling sleeve is correctly and safely engaged under the flange of the collar at the upper end of the valve body, and it is impossible for the pipe section to open the valve until after the pipe section has passed through the sealing gasket 19.

I claim:

1. In a pipe coupling of the character described, a tubular valve body, a pipe section adapted for telescoping movement thereinto, and a bayonet coupling for the body and the pipe section including a pair of coupling elements interengageable by endwise insertion of one of the elements into the other, followed by a turning movement of said first element, the said coupling being eccentric relative to said pipe section and said valve body so as to retain the pipe section out of alinement with the valve body during the insertion period.

2. In a pipe coupling of the character described, a tubular valve body, a pipe section adapted for telescoping movement thereinto, and a bayonet coupling for the body and the pipe section including a pair of coupling elements interengageable by endwise insertion of one of the elements into the other, followed by a turning movement of said first element, the said coupling being eccentric relative to said pipe section and said valve body so as to retain the pipe section out of alinement with the valve body during the insertion period, the amount of eccentricity of said elements being proportioned to effect alinement of the pipe section with the body at the end of the turning movement.

3. In a pipe coupling of the character described, a tubular valve body, a pipe section adapted for telescoping movement thereinto, and a bayonet coupling for the body and the pipe section including a pair of coupling elements interengageable by endwise insertion of one of the elements into the other, followed by a turning movement of said first element, the said coupling being eccentric relative to said pipe section and said valve body so as to retain the pipe section out of alinement with the valve body during the insertion period, the amount of eccentricity of said elements being proportioned to effect alinement of the pipe section with the body at the end of the turning movement, the pipe section and its coupling element having cooperative means for projecting the pipe section into the valve body after alinement has been effected.

4. In a pipe coupling of the character described, a tubular valve body, a pipe section adapted for telescoping movement thereinto, a collar at one end of the valve body having a bayonet slot therein, and a sleeve on the pipe section having a flange adapted for anchoring in the bayonet slot upon endwise insertion followed by a turning movement, the openings of the valve body and the sleeve being similarly off-centered with respect to the axis of the turning movement and located so as to be brought into full registry only at the end of the turning movement, said pipe section being proportioned for a sliding fit in said valve body whereby the pipe section is prevented from entering the valve body until the turning movement of the sleeve has been completely effected.

5. In a pipe coupling of the character described, a tubular valve body, a pipe section adapted for telescoping movement thereinto, a collar at one end of the valve body having a bayonet slot therein, and a sleeve on the pipe section having a flange adapted for anchoring in the bayonet slot upon endwise insertion followed by a turning movement, the openings of the valve body and the sleeve being similarly off-centered with respect to the axis of the turning movement and located so as to be brought into full registry only at the end of the turning movement, whereby the pipe section is prevented from entering the valve body until the turning movement of the sleeve is effected, said pipe section and valve body being proportioned to interengage upon a reverse turning movement whereby the bayonet joint is firmly locked by the pipe section projecting into the valve housing.

6. In a pipe coupling of the character described, a tubular valve body, a pipe section adapted for telescoping movement thereinto, and a bayonet coupling including a coupling element secured on said valve body in eccentric relation thereto, and a second coupling element cooperative with the first and mounted in eccentric relation on said pipe section, said coupling elements having a fixed angle of rotation between uncoupled and fully coupled positions, and said valve body and pipe section being oriented with respect to said coupling elements to hold said valve body and pipe section out of alinement when in said uncoupled position and to bring said valve body and pipe section into alinement when in said fully coupled position.

7. A pipe section as defined in claim 6 in which said second coupling element and said pipe section have cooperating threaded means for advancing said pipe section into said valve body when in alinement in said fully coupled position.

References Cited in the file of this patent

UNITED STATES PATENTS

| | | |
|---|---|---|
| 913,949 | Gold | Mar. 2, 1909 |
| 1,968,421 | Proctor | July 31, 1934 |
| 2,034,933 | Wilson | Mar. 24, 1936 |
| 2,121,244 | Buckner | June 21, 1938 |
| 2,327,611 | Scheiwer | Aug. 24, 1943 |
| 2,730,382 | De Mastri | Jan. 10, 1956 |
| 2,790,572 | Flaith et al. | Apr. 30, 1957 |
| 2,829,907 | Gill | Apr. 8, 1958 |